United States Patent
Lindoff et al.

(10) Patent No.: US 9,838,863 B2
(45) Date of Patent: Dec. 5, 2017

(54) DEVICE-TO-DEVICE COMMUNICATION IN A CELLULAR COMMUNICATION SYSTEM

(71) Applicant: Telefonaktiebolaget L M Ericsson (publ), Stockholm (SE)

(72) Inventors: Bengt Lindoff, Bjärred (SE); Stefano Sorrentino, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 151 days.

(21) Appl. No.: 14/437,117

(22) PCT Filed: Mar. 12, 2015

(86) PCT No.: PCT/EP2015/055182
§ 371 (c)(1),
(2) Date: Apr. 20, 2015

(87) PCT Pub. No.: WO2015/136039
PCT Pub. Date: Sep. 17, 2015

(65) Prior Publication Data
US 2016/0302051 A1  Oct. 13, 2016

Related U.S. Application Data

(60) Provisional application No. 61/951,746, filed on Mar. 12, 2014.

(51) Int. Cl.
*H04W 4/00* (2009.01)
*H04W 8/00* (2009.01)
(Continued)

(52) U.S. Cl.
CPC ....... *H04W 8/005* (2013.01); *H04W 72/0446* (2013.01); *H04W 76/023* (2013.01)

(58) Field of Classification Search
CPC .................................................. H04W 72/0446
See application file for complete search history.

(56) References Cited

U.S. PATENT DOCUMENTS

2009/0144213 A1\* 6/2009 Patil .................... G06K 9/6253
706/46
2011/0255450 A1   10/2011 Wang et al.
(Continued)

FOREIGN PATENT DOCUMENTS

WO   2010097645 A1   9/2010
WO   2011069295 A1   6/2011

OTHER PUBLICATIONS

Unknown, Author, "Synchronization Procedures for D2D Discovery and Communication", 3GPP TSG RAN WG1 Meeting #76, R1-140773, Prague, Czech Republic, Feb. 10-14, 2014, 1-7.
(Continued)

*Primary Examiner* — Samina Choudhry
(74) *Attorney, Agent, or Firm* — Murphy, Bilak & Homiller, PLLC

(57) ABSTRACT

A method performed in a device-to-device (D2D) enabled device, for transmitting discovery signals for enabling D2D communication establishment in a cellular communication system is disclosed. The method comprises assigning, by a controller of the device, a time in a periodic time schedule and at least a subcarrier among a plurality of subcarriers assigned for carrier for D2D communication of the communication system based on a dynamic rule for spreading timing and/or subcarrier selection for the discovery signal. Furthermore, the method comprises transmitting, by a transceiver of the device, the discovery signal according to the time and subcarrier assignment provided by the controller.

25 Claims, 8 Drawing Sheets

(51) Int. Cl.
*H04W 72/04* (2009.01)
*H04W 76/02* (2009.01)

(56) References Cited

U.S. PATENT DOCUMENTS

| | | |
|---|---|---|
| 2011/0268004 A1 | 11/2011 | Doppler et al. |
| 2012/0083283 A1 | 4/2012 | Phan et al. |
| 2012/0129540 A1 | 5/2012 | Hakola et al. |
| 2013/0109301 A1 | 5/2013 | Hakola et al. |
| 2013/0258996 A1* | 10/2013 | Jung ................. H04W 72/1284 370/330 |
| 2013/0322413 A1 | 12/2013 | Pelletier et al. |

OTHER PUBLICATIONS

Unknown, Author, "Discussion on D2D broadcast resource allocation", Intel Corporation, 3GPP TSG RAN WG1 Meeting #76, R1-140130, Prague, Czech Republic, Feb. 10-14, 2014, 1-7.

3GPP, "3rd Generation Partnership Project; Technical Specification Group SA; Feasibility Study for Proximity Services (ProSe) (Release 12)", 3GPP TR 22.803 V1.0.0, Aug. 2012, 1-33.

Unknown, Author, "Resource allocation for D2D discovery", CATT, 3GPP TSG RAN WG1 Meeting #74, R1-133786, Barcelona, Spain, Aug. 19-23, 2013, 1-6.

* cited by examiner

DEVICE-TO-DEVICE COMMUNICATION IN A CELLULAR COMMUNICATION SYSTEM

TECHNICAL FIELD

The present invention generally relates to device-to-device communication in a cellular communication system.

BACKGROUND

The term device-to-device (D2D) used in the following corresponds to any direct transmission occurring between two or more devices in a cellular devices, i.e. not via one or more network nodes or other network elements, such as an eNodeB, a backbone network, etc., for the purpose of e.g. direct control signaling, direct data communication or peer device presence discovery.

Although the idea of enabling D2D communications as a means of relaying in cellular networks was proposed by some early works on ad hoc networks, the concept of allowing local D2D communications to (re)use cellular spectrum resources simultaneously with ongoing cellular traffic is relatively new. Because the non-orthogonal resource sharing between the cellular and the D2D layers has the potential of reuse gain and proximity gain, at the same time increasing the resource utilization, D2D communications underlying cellular networks has received considerable interest in the recent years.

Specifically, in $3^{rd}$ Generation Partnership Project Long Term Evolution (3GPP LTE) networks, such as LTE Direct, i.e. employing D2D, communication can be used in commercial applications, such as cellular network offloading, proximity based social networking, or in public safety situations in which first responders need to communicate with each other and with people in the disaster area. See for example the specification 3GPP TR 22.803, V1.0.0, 2012-08.

SUMMARY

Aspects of the invention are defined in the independent claims. Further embodiments are defined by in the dependent claims.

According to a first example, there is provided a method performed in a device-to-device (D2D) enabled device, for transmitting discovery signals for enabling D2D communication establishment in a cellular communication system. The method comprises assigning, by a controller of the device, a time in a periodic time schedule and at least a subcarrier among a plurality of subcarriers assigned for carrier for D2D communication of the communication system based on a dynamic rule for spreading timing and/or subcarrier selection for the discovery signal. Furthermore, the method comprises transmitting, by a transceiver of the device, the discovery signal according to the time and subcarrier assignment provided by the controller.

The assignment of time may comprise one of a plurality of timing offset steps within a physical resource block defined by the communication system. The assignment may comprise jittering the time around the respective timing offset step.

The dynamic rule may comprise a function of one or more identifiers provided by the communication system such that timing assignment for respective D2D enabled devices is determined by the function. In some embodiments, the identifiers provided by the communication system on which the function determines timing may comprise at least one of carrier frequency, network identity, and cell identity. In some embodiments, the dynamic rule may comprise a stochastic randomization function.

The assignment of subcarrier or subcarriers may comprise one of a plurality of subcarrier sets within a physical resource block defined by the communication system.

The dynamic rule may comprise a function of one or more identifiers provided by the communication system such that subcarrier assignment for respective D2D enabled device is determined by the function. The identifiers provided by the communication system on which the function determines subcarrier assignment may comprise at least one of carrier frequency, network identity, and cell identity.

The method may comprise receiving, by the transceiver, the dynamic rule from a controlling node of the communication system. Said controlling node may be arranged to coordinate the dynamic rule.

According to a second example, there is provided a method for transmitting discovery signals for enabling D2D communication establishment in a cellular communication system. The method comprises assigning, for each D2D enabled device, a time in a periodic time schedule and at least a subcarrier among a plurality of subcarriers assigned for carrier for D2D communication of the communication system based on a dynamic rule for spreading timing and/or subcarrier selection for the discovery signal. Transmitting the discovery signal by the respective D2D enabled device according to the time and subcarrier assignment.

The assignment of time may comprises one of a plurality of timing offset steps within physical resource blocks defined by the communication system. The assignment may comprise jittering the time around the respective timing offset step.

The dynamic rule may comprise a function of one or more identifiers provided by the communication system such that timing assignment for respective D2D enabled devices is determined by the function. In some embodiments, the identifiers provided by the communication system on which the function determines timing may comprise at least one of carrier frequency, network identity, cell identity. In some embodiments, the dynamic rule may comprise a stochastic randomization function.

The assignment of subcarrier or subcarriers may comprise one of a plurality of subcarrier sets within a physical resource block defined by the communication system.

The dynamic rule may comprise a function of one or more identifiers provided by the communication system such that subcarrier assignment for respective D2D enabled device is determined by the function.

The identifiers provided by the communication system on which the function determines subcarrier assignment may comprise at least one of carrier frequency, network identity, and cell identity.

The dynamic rule may be coordinated from a controlling node of the communication system.

According to a third example, there is provided a D2D enabled device, for operating in a cellular communication system, arranged to transmit discovery signals for enabling D2D communication establishment in the cellular communication system. The device comprises a controller and a transceiver. The controller is arranged to assign a time in a periodic time schedule and at least a subcarrier among a plurality of subcarriers assigned for carrier for D2D communication of the communication system based on a dynamic rule for spreading timing and/or subcarrier selection for the discovery signal. The transceiver is arranged to transmit the discovery signal according to the time and subcarrier assignment provided by the controller.

The assignment of time may comprise one of a plurality of timing offset steps within a physical resource block defined by the communication system. The assignment may comprise jittering the time around the respective timing offset step.

The dynamic rule may comprise a function of one or more identifiers provided by the communication system such that timing assignment for respective D2D enabled device is determined by the function. In some embodiments, the identifiers provided by the communication system on which the function determines timing may comprise at least one of carrier frequency, network identity, and cell identity. In some embodiments, the dynamic rule may comprise a stochastic randomization function.

The assignment of subcarrier or subcarriers may comprise one of a plurality of subcarrier sets within a physical resource block defined by the communication system.

The dynamic rule may comprise a function of one or more identifiers provided by the communication system such that subcarrier assignment for respective D2D enabled device is determined by the function. In some embodiments, the identifiers provided by the communication system on which the function determines subcarrier assignment may comprise at least one of carrier frequency, network identity, and cell identity.

The transceiver may be arranged to receive the dynamic rule from a controlling node of the communication system. The controlling node may be arranged to coordinate the dynamic rule.

According to a fourth example, there is provided a computer program comprising instructions which, when executed on a processor of a communication apparatus, causes the communication apparatus to perform the method according to the first example.

According to a fifth example, there is provided a computer-readable medium having stored thereon a computer program comprising instructions which, when executed on a processor of a communication apparatus, causes the communication apparatus to perform the method according to the first example.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

The context of this disclosure is cellular public land mobile networks (PLMNs). D2D communication entities using an LTE Direct link may reuse the same physical resource blocks (PRB), i.e. time/frequency resources, as used for cellular communications either in the downlink or in the uplink or both. The reuse of radio resources in a controlled fashion can lead to the increase of spectral efficiency at the expense of some increase of the intra-cell interference. Typically, D2D communicating entities use uplink (UL) resources such as UL PRBs or UL time slots, but conceptually it is possible that D2D, such as LTE Direct, communications takes place in the cellular downlink (DL) spectrum or in DL time slots. For ease of presentation, in the present disclosure we assume that D2D links use uplink resources, such as uplink PRBs in an frequency duplex division (FDD) or uplink time slots in an a cellular time division duplex (TDD) system, but the main ideas would carry over to cases in which D2D communications take place in DL spectrum as well. The term "sidelink" is sometimes used to denote D2D communication.

Various aspects of D2D resource handling are proposed herein. For example, some embodiments introduce the concept of "D2D measurement gaps". Other embodiments introduce the concept of randomization of D2D resources, or assigning D2D resources according to a dynamic rule. It should be noted that such embodiments could be combined, but could also be employed independently from each other.

In the following, the terms "device" and "UE" (User Equipment) are used interchangeably, and may consider any element that is capable of operating in a cellular communication network, such as a mobile phone, communication card, modem, etc.

Figure 1:
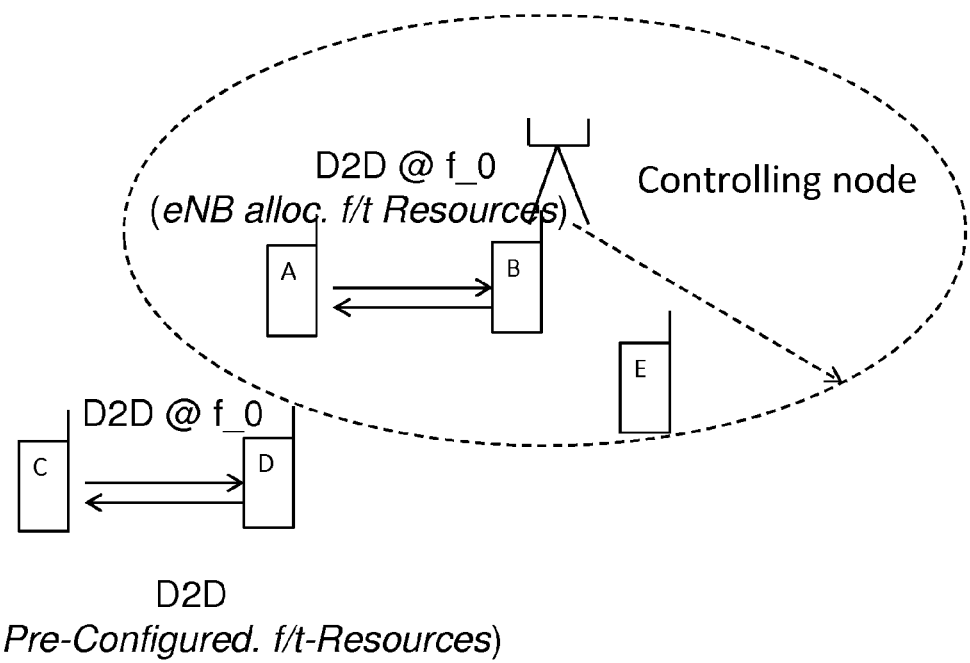
FIG. 1 schematically illustrates the principles for D2D communication within LTE.

FIG. 1 schematically illustrates the principles for D2D communication within LTE. A controlling node, such as an eNodeB or Cluster Head, is controlling the communication on a frequency carrier $f_0$. In a first scenario, devices A and B are communicating directly via a D2D link, and both devices are inside NW coverage of the controlling node. The controlling node then allocates the radio resources to use for D2D communication. In the second scenario devices C and D may have D2D communication out of reach from a controlling node, i.e. out of coverage. In this case the D2D communication devices are using pre-configured frequency and/or time resources for D2D communication, which may be assigned by standard or by device capabilities.

Figure 2:
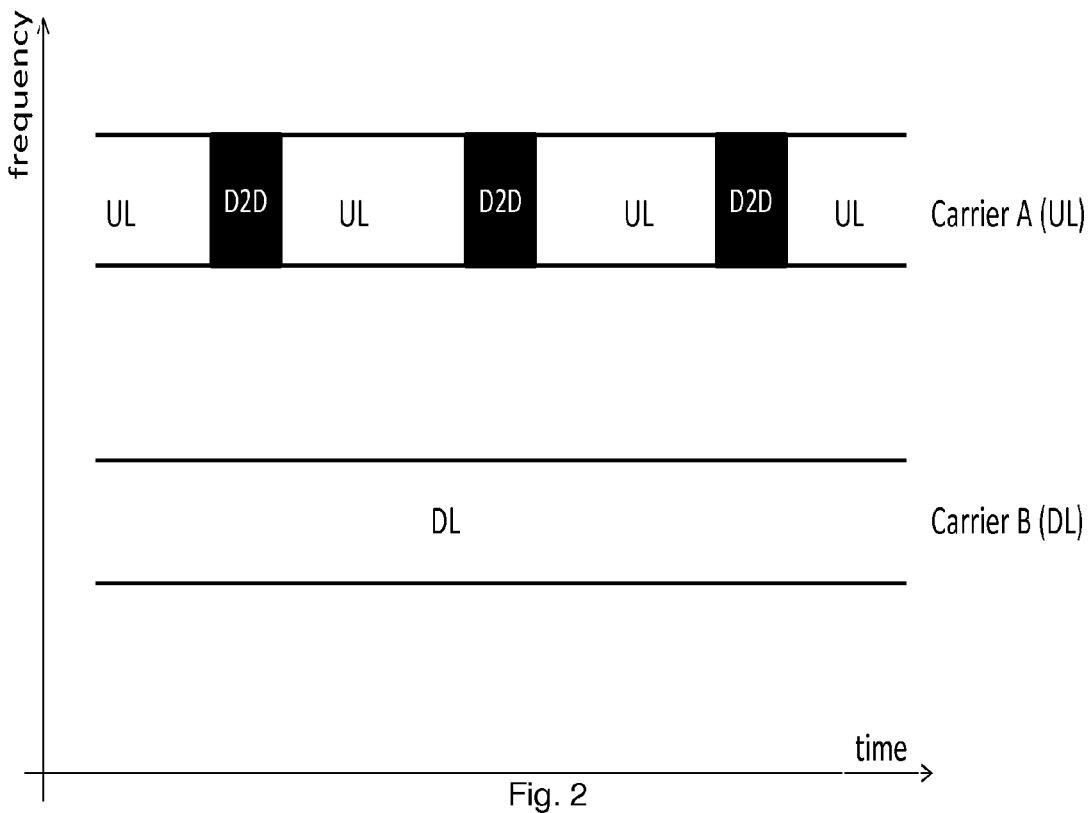
FIG. 2 schematically illustrates a time-frequency diagram of a legacy D2D and cellular operation for a FDD carrier pair.

FIG. 2 schematically illustrates a legacy D2D and cellular operation for a FDD carrier pair. Two independent receiver chains would thus be needed for the DL and UL carriers in the receiving device.

Figure 3:
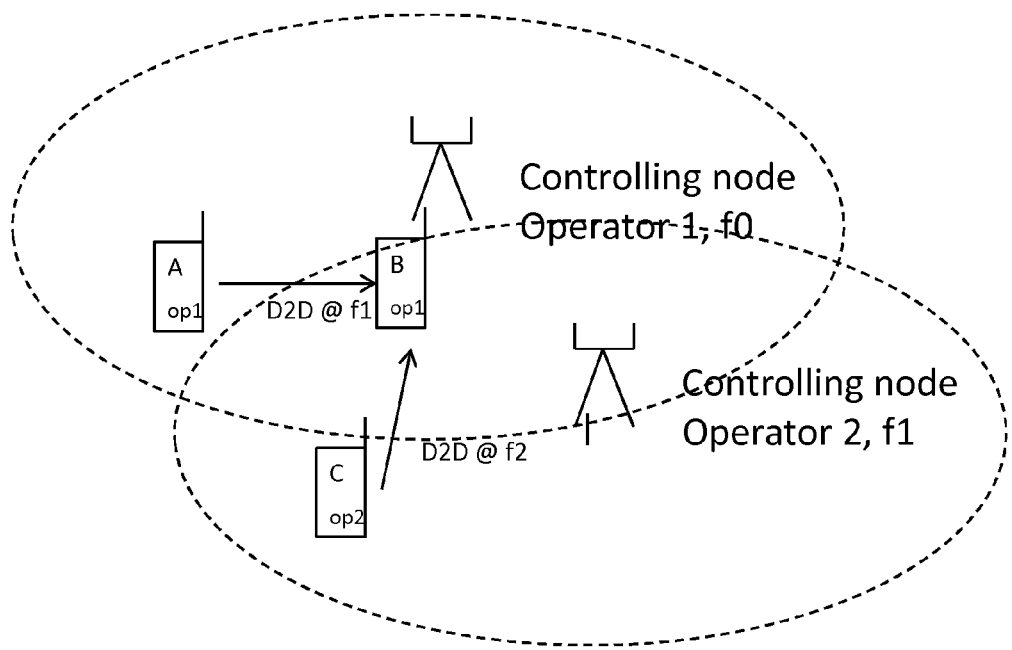
FIG. 3 schematically illustrates an example where devices are using the same operator.

D2D communication within LTE should be able to work for inter-PLMN cases, i.e. with devices operating in another PLMN, e.g. operated by another operator, as well as intra-PLMN but inter-carrier, i.e. with devices operating in the same PLMN but on another carrier in possession of the operator of the PLMN. This means that a device operating under a first operator subscription on a first carrier frequency should be able to discover, and consequently in a later stage also communicate with, a second device operating under a second operator subscription on a second carrier frequency. FIG. 3 schematically illustrates an example where device B may easily detect the device A since they are using the same operator 1. However, device B should also discover device C operating on another carrier frequency under operator 2.

From a regulatory point of view, a device with a subscription for a first operator, i.e. operating in a first PLMN, may not be allowed to transmit in another operator's spectrum, which causes an issue for the inter-PLMN case. Therefore, with the current assumption within 3GPP about inter-PLMN D2D discovery, the device may only transmit D2D signals in own UL spectrum but may be able to monitor and discover D2D signals listen in the spectrum of other PLMNs, which provides a solution for the inter-PLMN case.

Transmitting discovery signals for enabling D2D communication establishment needs to be performed in a cellular communication system to enable one or more D2D enabled device recognizing that there is another D2D enabled device which it may perform D2D communication with. Thus, D2D enabled devices monitors discovery signals from other D2D enabled devices, which is performed similar to other search operations within a cellular communication network, e.g. cell search, which is therefore not further elucidated here.

A certain network (NW) node on a certain carrier may for example allocate a subset of resources for D2D discovery or D2D communication. Typically the D2D resources may be allocated on a periodic basis, the periodicity typically standardized, e.g. for instance 29 adjacent subframes every 10th second. Since NW nodes and operators are not synchronized or coordinated, inter-PLMN, and sometimes also intra-PLMN but intra carrier inter NW nodes, or inter-carrier NW nodes, there will be a significant risk for collision between allocated D2D resources between different carrier and inter-PLMN. Furthermore, it may in some embodiment also be true for intra-PLMN, inter carrier or even intra-PLMN, intra-carrier between NW nodes. Then devices from one operator (or camping on one carrier, or one NW node) may not find discovery signals from devices from another operator (or camping on other carriers, or other nodes due to that the D2D resources may collide. "Collide" may in this context include at least two scenarios: Two devices in the same vicinity transmits discovery signals at the same time and frequency, or a device transmits its discovery signal at a certain time and frequency and another device transmits its discovery signal at a certain time but on another frequency, but may encounter problems spotting the (weak) discovery signal from the first device e.g. due to self-introduced interference degrading receiving performance at the transmitting of the own discovery signal. A further scenario may be that a UE need to listen for discovery signals on own operator carrier at a time instant but another carrier also have allocated D2D resources at that time instant. Hence the device may not be able to listen on several carriers at the same time.

Some of the embodiments assume that a NW node, e.g., eNodeB, is aware of the D2D resources potentially used by at least some neighbor UEs. Such resources may consist of the D2D resources used in a neighbor cell, on another carrier, by another PLMN, by out of coverage UEs, which are possibly coordinated by a third device, etc. The term "resources" indicates time and/or frequency resources on a given carrier. The NW node may acquire information regarding the D2D resources used by devices in proximity in any way, including signaling and measurements.

The embodiments may be combined in any way.

According to some embodiments, there are provided D2D measurement gaps, signaling by the NW and corresponding UE behavior.

According to some embodiments, a rule is defined such that a UE is exempted from cellular DL reception and/or UL transmission whenever the condition(s) defined in the rule are fulfilled. Some examples of rules are On a given carrier, a UE is exempted from the requirement to read DL channels in subframes that potentially carry D2D channels.

On a given carrier, a UE is exempted from the requirement to transmit UL channels in subframes that potentially carry D2D channels, on a given carrier.

The different rules may be combined.

The set of subframes potentially carrying D2D channels may be signaled to the UE by the NW or may be obtained by the UE by measurements. The rules given as examples above may be defined in specifications or signaled by the NW to the UEs.

An advantage of some embodiments is that they enable a UE to reuse a common transceiver for both D2D and cellular communications, on a certain carrier or on multiple carriers. In other words, the behavior proposed above allows a UE to use the transceiver chain to read and/or transmit D2D signals in D2D subframes, i.e., subframes potentially used for D2D. It is noted that the above example rules may be limited to certain types of D2D subframes, such as subframes potentially carrying discovery messages, subframes potentially carrying D2D scheduling assignments, subframes potentially carrying D2D data, subframes potentially carrying D2D control information, etc.

According to some embodiments, additional examples of rules for exempting UEs from the requirement to transmit and/or receive cellular signals in favor of D2D transmission and/or reception. All the rules discussed here may be combined in any way.

The NW may configure and signal a set of measurement gaps for D2D operation. Such measurement gaps may be limited to UL and/or DL resources, only. The term measurement gap means that the UEs are not expected to transmit and/or receive any cellular signal on the serving cell during the measurement gap. The advantage of the measurement gap, from a UE perspective, is that the UE can free up hardware resources, e.g. the receiver chain, to perform D2D operation on a neighbor cell or another carrier. A further potential advantage of D2D measurement gaps is that co-channel interference may be lower during D2D measurement gaps.

Possibly, the NW may indicate to the UE which carrier should be preferably monitored during the D2D measurement gaps.

The D2D measurement gaps may overlap with the D2D subframes as defined above. In this case, explicit signaling of the position of the D2D measurement gaps may be avoided by the NW, because the UE is able to deduce the timing of the D2D measurement gaps from the timing of the D2D subframes.

Some examples of rules defining the UE behavior with D2D measurement gaps may be On a given carrier, a UE is exempted from the requirement to read DL channels in subframes that are D2D measurement gaps.

On a given carrier, a UE is exempted from the requirement to transmit UL channels in subframes that are D2D measurement gaps.

Also here, different rules may be combined in any way.

Figure 4:
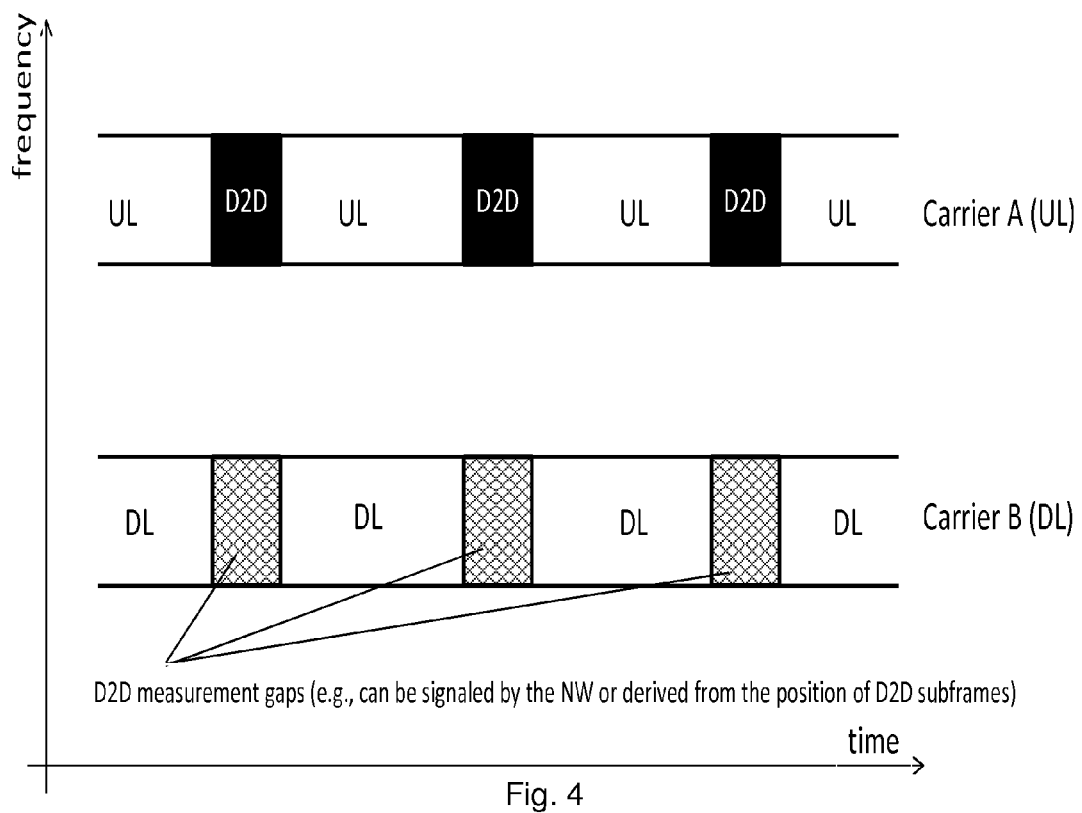
FIG. 4 schematically illustrates a time-frequency diagram of an example where the receiving device may switch the single receiver chain between DL reception and D2D reception in D2D subframes.

As an example, consider a FDD D2D-enabled UE equipped with a single receiver chain. Normally, the receiver chain operates on DL spectrum, i.e. for cellular DL, or UL spectrum, i.e. for D2D reception, on the serving cell. During D2D measurement gaps, the receiver chain may be used to detect D2D signals or D2D related control information, which may be transmitted by UEs, by eNodeBs or by other nodes, either on the serving cell carrier or on other carriers. This is schematically illustrated in FIG. 4, wherein the receiving device may switch the single receiver chain between DL reception and D2D reception in D2D subframes.

According to some embodiments, there are provided configuration of the D2D measurement gaps by the NW and exceptions to D2D measurement gaps.

In some embodiments, the NW configures D2D measurement for a given UE on at least a subset of the resources assigned to D2D transmissions on the own cell and/or on other cells. Such other cells may operate on the same or on other carriers as the NW node configuring the D2D measurement gaps. The NW node may acquire information regarding the D2D resources used by devices in proximity in various ways, including signaling over backhaul, signaling by UEs and over the air measurements.

The NW may even configure the D2D measurement gaps in such a way that collision with resources potentially used by RRC_IDLE UEs in the cell is avoided. For example, the D2D measurement gaps may be arranged not to overlap with subframes used for paging, random access channel (RACH), synchronization signal (e.g. primary/secondary synchronization signals, PSS/SSS) transmission, broadcast control information, cellular measurement gaps, etc.

In order to handle potential collisions between D2D measurement gaps and subframes used by at least RRC_IDLE UEs for important cellular operations, there may be defined modified rules for handling the D2D measurement gaps defined as demonstrated above. Examples of modified rules may be On a given carrier, a UE is exempted from the requirement to read DL channels in subframes that are D2D measurement gaps and that do not potentially carry paging, RACH, synchronization signals, broadcast control information or that are cellular measurement gaps.

On a given carrier, a UE is exempted from the requirement to transmit UL channels in subframes that are D2D measurement gaps and that do not potentially carry paging, RACH, synchronization signals, broadcast control information or that are cellular measurement gaps.

It is to be understood that the above rules are mere examples. In particular, not all the channels mentioned in the above example rules need to be included in the agreed rules.

Also, D2D measurement gaps may or may not have higher priority than legacy cellular measurement gaps in defining the UE behavior.

Figure 5:
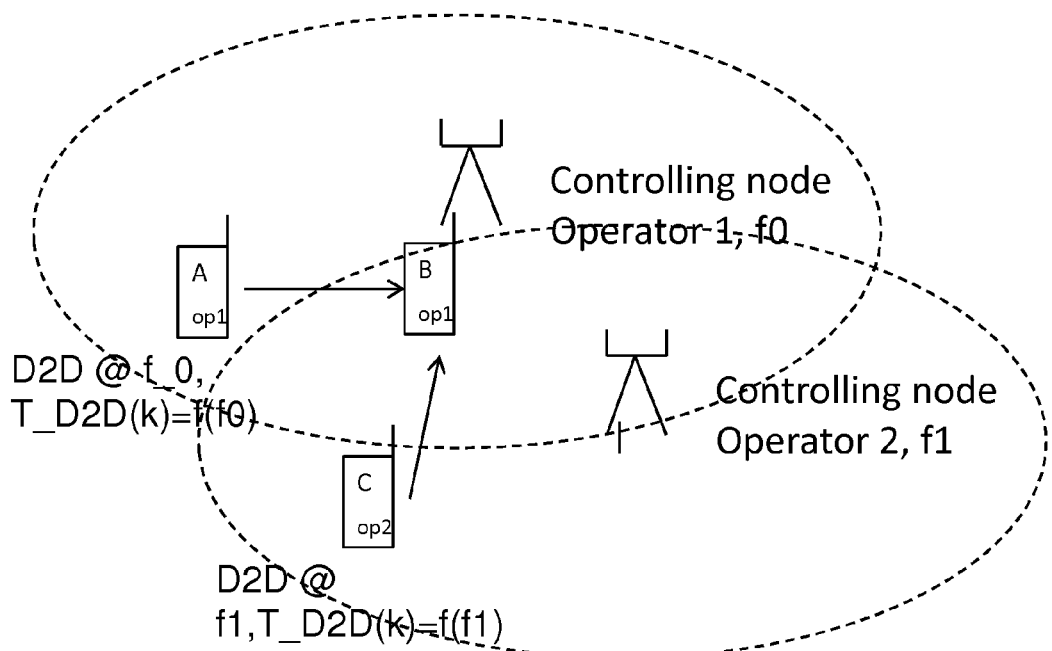
FIG. 5 schematically illustrates an example where devices are using randomization of D2D resources.

According to some embodiments, there are provided randomization of D2D resources. Reference is here made to FIG. 5 for the context of the network elements.

Randomization should in this context be considered to arrange or choose something in a random way or order, to make something random. Random should however be considered in sense how the randomization appears for an observer, although the arranging of the "random" pattern by the creator, i.e. the particular UE that transmits the discovery signal, follows a deterministic rule, e.g. based on a pseudo-random and/or other function.

In some embodiments, the D2D resources used by a certain cell, carrier, PLMN or similar are randomized in a way that reduces the probability of systematic time overlap, i.e. collision, with the D2D resources used in another cell or/and carrier or/and PLMN.

Possibly, the randomization may be constructed or constrained in such a way that D2D resources on a given carrier never overlap with the paging subframes and/or random access resources and/or broadcast control information resources on a given carrier. This is to allow the UE to switch the transceiver between cellular and D2D reception and avoid collisions between cellular and D2D for a given carrier.

Possibly, the D2D resources may be indicated by a non-zero time offset relative to the paging resources on a given carrier.

Figure 6:
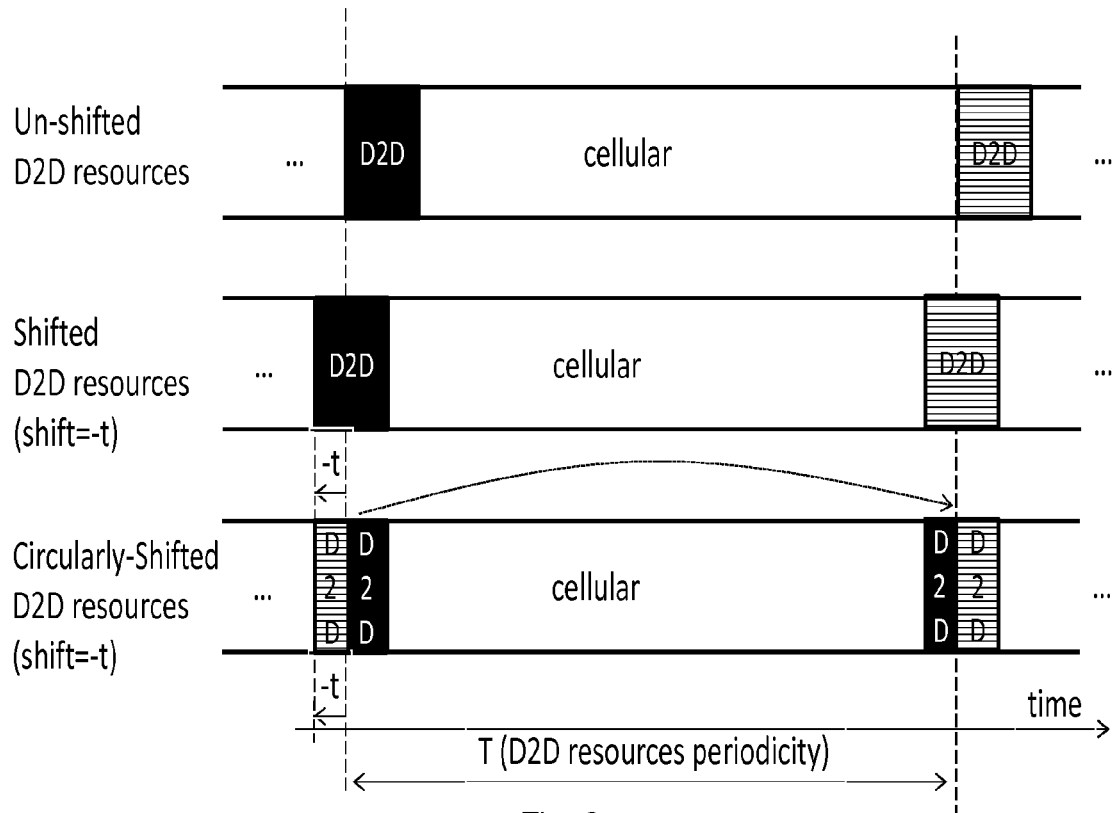
FIG. 6 schematically illustrates a time-frequency diagram of examples with application of timing offset of the D2D resources.

In one example, D2D resources have a periodic structure with a pre-defined or configurable period T (with the origin relative to a subframe numbering or other counter relevant for the carrier). The D2D resources are time-shifted by a timing offset, e.g., $[0, \ldots, T-1]$ or $[-T/2+1, \ldots, T/2]$), which may be cell, carrier or PLMN specific. Possibly, when a shift is applied, the D2D resources are circularly shifted within the period T, as is illustrated in FIG. 6.

In some examples, there exist some rules for implicit derivation of the D2D resources shift. For example, the shift may be a function of one or more parameters such as, e.g., the PLMN Identity, the Physical Cell Identity, the Virtual Cell Identity, the Carrier Frequency, the LTE channel number EARFCN, etc. In some examples the shift may also be related to a common clock valid for all carriers, for instance a clock based on GPS. A common clock or time reference for the time shifts may help to avoid that the time shifts collide anyway due to different time references for different PLMNs.

In some examples, the D2D resource allocation and/or the D2D resource shift are time-varying, possibly according to a pre-defined pattern. For example, the time shift may be periodically updated based on a predefined pattern of shifts. The time-shift pattern may be a function of, or may be initialized as a function of, e.g., the PLMN Identity, the Physical Cell Identity, the Virtual Cell Identity, the Carrier Frequency, EARFCN, etc. This ensures that systematic resource collisions are avoided between cells and/or carriers.

This can be alleviated by assigning, for each of the D2D enabled devices, either of a time in a periodic time schedule and at least a subcarrier among a plurality of subcarriers assigned for carrier for D2D communication of the communication system based on a dynamic rule for spreading timing and/or subcarrier selection for the discovery signal. The risk of collision may thus be reduced. The discovery signal is thus transmitted by the respective D2D enabled device according to the time and subcarrier assignment.

Since a dynamic rule is applied, the probability of collision is reduced. For the example mentioned above, the timing may be assigned in any of the 29 adjacent subframes, wherein the devices may assign that differently to reduce the collision risk. As is evident from this description, the term "dynamic rule" can be interpreted as rule for assigning timing and/or subcarriers for D2D transmission such that the assigned timing and/or subcarriers for a given device is changing in time according to the rule.

For example, consider that D2D resources have a periodic structure with a pre-defined period T, but an offset (0, . . . , T) may be cell, carrier or PLMN dependent. Note that the D2D resources may correspond to a resource pattern in time and/or frequency domains. A pattern may correspond to a certain subset of subframes and the pattern may be periodic every T subframes. In one example the dependence on carrier frequency may be based on the carrier frequency, e.g., E-UTRA Absolute Radio Frequency Channel Number (EARFCN), i.e. the LTE channel number. Hence, the D2D resources may be allocated according to $$T_{D2D}(k)=k*T+t_0(\text{EARFCN}), 0<t_0<T, k=1, 2, 3 \ldots$$

where $T_{D2D}$ is the D2D resource allocation in time, e.g. sub frame number, and $t_0(\cdot)$ is the offset during the period T. In some embodiments the sub frame numbers may be aligned over carriers based on a common clock, e.g. GPS time reference.

Additionally or alternatively, a carrier or PLMN dependent jitter is added to the period T of the D2D resources, wherein the period may be fixed, or provided as demonstrated above. The term "jitter" in this context refers to seemingly random or pseudo random variations of the timing around a nominal value. Again the jitter may be based on the EARFCN. Hence, the D2D resources may be allocated according to $$T_{D2D}(k)=k*T+t_1(\text{EARFCN},k)-x<t_1<x$$

where the timing $t_1$ is jittering around 0 as function of the EARFCN and sub frame number. In some embodiments the sub frame numbers may be aligned over carriers based on a common clock, e.g. GPS time reference.

As an extension to the above PLMN or carrier frequency dependent randomization, the timing or jitter may also be randomized based on physical cell identity or Cluster Head/sync source identity.

In yet another example the offset may be carrier/PLMN dependent, while the jitter may depend on physical cell ID (PCI), or vice versa, and hence the D2D allocation for a certain node on a certain carrier/PLMN may include both an offset and a jitter.

Additionally or alternatively, the randomization may be done in frequency domain, i.e. which Resource Blocks (RBs) that are allocated to D2D resources for a given cell/Cluster head identity, carrier frequency or PLMN etc. similar to the functions demonstrated above for the timing offset. Such a randomization approach may be especially suitable for the intra-carrier case, and hence as a function of the transmitting node identity, e.g. Physical Cell ID or Global Cell ID. Such randomization may reduce the risk for collision between D2D resources between cells and hence may reduce the interference risk and increase the detection probability.

Further, randomization may further be provided over a longer time scale. In one example, a variation on a larger scale, i.e. larger than the D2D resource periodicity T as demonstrated above, may be provided. For example every of the longer periods, i.e. in the order of one or a few minutes, the assignment is changed. The change may be as a function of carrier, PLMN, cell ID etc., and may for example be a variation of the function demonstrated above.

The randomization may be determined from a shift register with an initial state, i.e. seed, that is a function of carrier frequency, PLMN, cell ID etc. In another example, a general mathematical function may generate the randomization as a function of carrier frequency, PLMN, cell ID etc. In yet another example, the randomization may be determined from a pre-defined look up table, which for example may be given by the specifications of the communication system.

The assignment of time may be arranged to comprise one of a plurality of timing offset steps. The timing offset steps may be in the time-frequency resources as demonstrated above, i.e. the physical resource blocks defined by the communication system. The assignment may also comprise jittering the time around the respective timing offset step. Assignment of "time" should in this context be considered any of a start time, a stop time, or a time associated with a specific instant, e.g. center time, of a time interval assigned for the transmission of the discovery signal. The assignment of "time" may additionally include assignment of the duration of the time interval.

The dynamic rule may comprise a function of one or more identifiers provided by the communication system such that timing assignment for respective D2D enabled device is determined by the function. An example of this is given above. The identifiers provided by the communication system may for example comprise one or more of a carrier frequency, a network identity, a cell identity, etc., wherein the function may determine the timing therefrom.

The dynamic rule may for example comprise a stochastic randomization function or a pseudo-random function. A seed for the pseudo-random function may for example be one or more of a carrier frequency, a network identity, a cell identity, etc. The assignment of subcarrier or subcarriers may comprise one of a plurality of subcarrier sets within the physical resource blocks defined by the communication system. Similar to the assignment of timing, the assignment of subcarrier or subcarriers, sole or in combination with the assignment of timing, may be based on a function of one or more identifiers provided by the communication system such that subcarrier assignment for respective D2D enabled device is determined by the function. For example, the identifiers provided by the communication system on which the function determines subcarrier assignment may comprises one or more of a carrier frequency, a network identity, a cell identity, etc. Also for the assignment of subcarrier or subcarriers, a stochastic randomization function or a pseudo-random function may be used. A seed for the pseudo-random function may for example be one or more of a carrier frequency, a network identity, a cell identity, etc.

The dynamic rule may be coordinated from a controlling node, e.g. an eNodeB or Cluster Head, of the communication system. Further examples of this will be given below.

Figure 7:
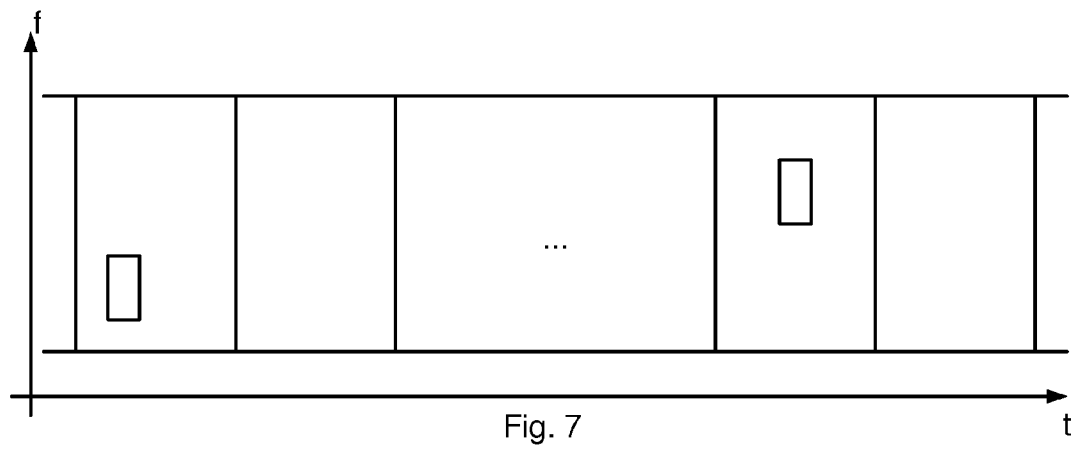
FIGS. 7 to 11 are time-frequency diagrams schematically illustrating different examples of assignment of timing and/or subcarrier selection for the discovery signal.
Figure 8:
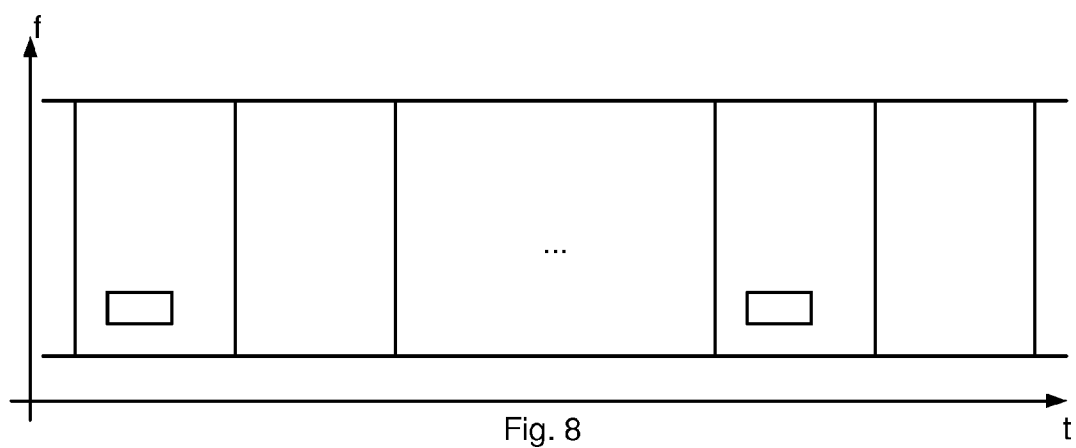
Figure 9:
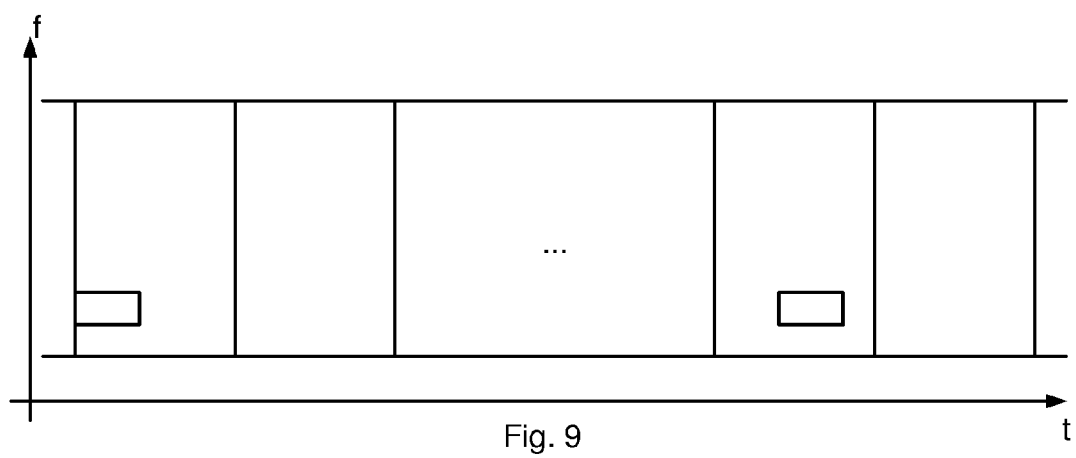
Figure 10:
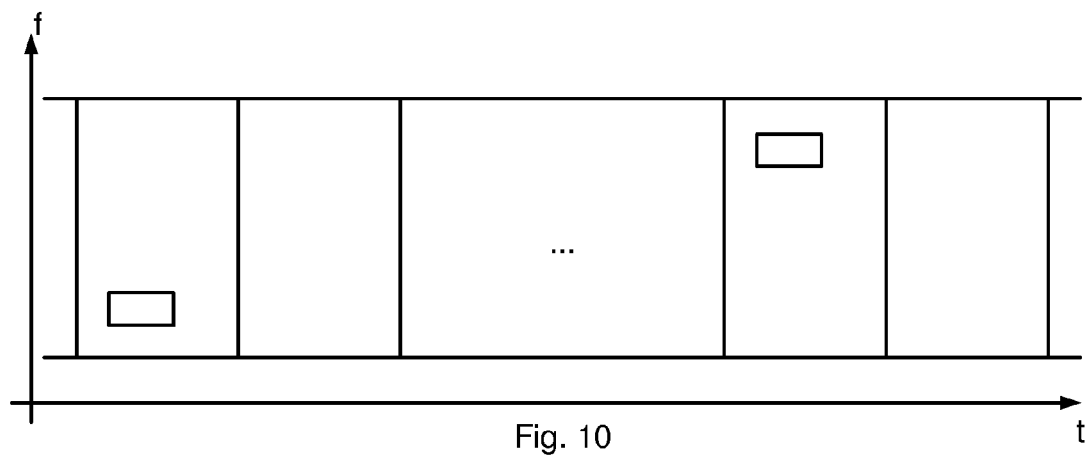
Figure 11:
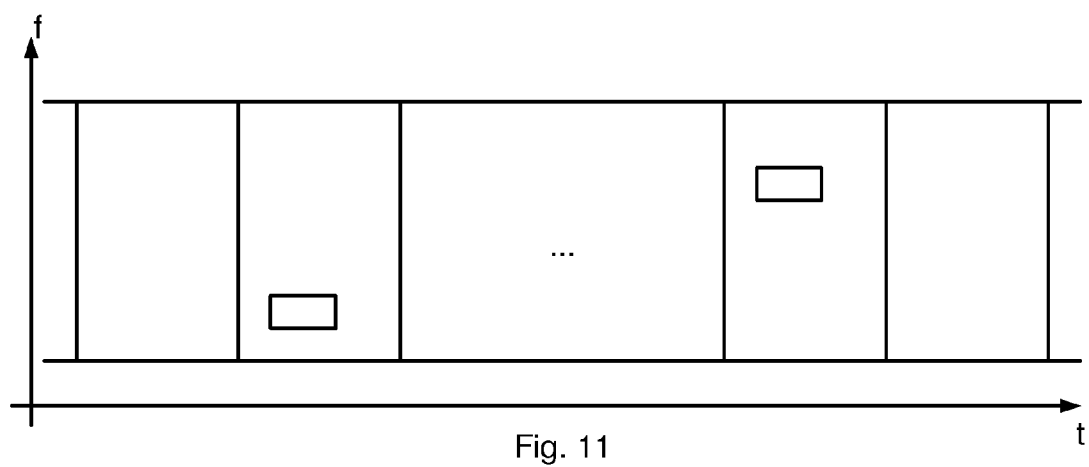

FIGS. 7 to 11 are a time-frequency diagram schematically illustrating different examples of assignment of timing and/or subcarrier selection for the discovery signal. FIG. 7 illustrates an example where assignment of time and subcarrier is made according to dynamic rules, e.g. randomized by pseudo-random schemes. FIG. 8 illustrates an example where assignment of time and subcarrier is made according to a rule where time and subcarrier is assigned to the same resource for each period T. FIG. 9 illustrates an example where assignment of time is made according to a dynamic rule, e.g. randomized by a pseudo-random scheme and subcarrier is assigned to the same resource for each period T. FIG. 10 illustrates an example where assignment of time is assigned to the same resource for each period T and subcarrier is made according to a dynamic rule, e.g. randomized by a pseudo-random scheme. FIG. 11 illustrates an example where assignment of time is assigned to the same resource for each period T, but is circularly shifted, and subcarrier is made according to a dynamic rule, e.g. randomized by a pseudo-random scheme. It is to be understood that the examples are numerous, and only a few of them are illustrated here.

Figure 12:
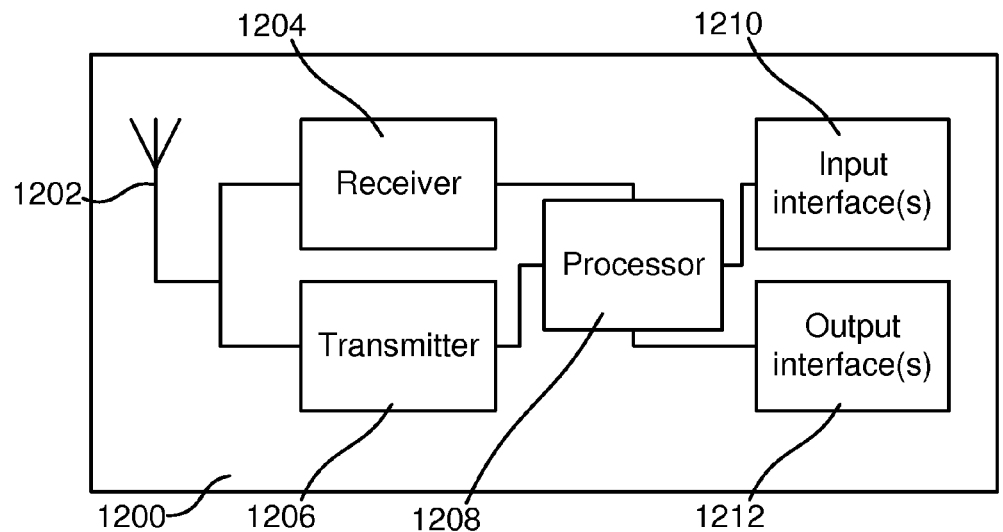
FIG. 12 is a block diagram schematically illustrating a network node according to an embodiment.

FIG. 12 is a block diagram schematically illustrating a network node 1200, e.g. a UE according to some embodiments. The network node comprises an antenna arrangement 1202, a receiver 1204 connected to the antenna arrangement 1202, a transmitter 1206 connected to the antenna arrangement 1202, a processing element 1208 which may comprise one or more circuits, one or more input interfaces 1210 and one or more output interfaces 1212. The interfaces 1210, 1212 can be user interfaces and/or signal interfaces, e.g. electrical or optical. The processing element 1208 comprises, for example, a microprocessor-based circuit or a DSP-based circuit, or other digital processing circuitry, such as an ASIC or FPGA. The processing element 1208 comprises fixed circuitry or programmed circuitry, or both. In at least one embodiment, the processing element 1208 is specially adapted according to the teachings herein, based at least in part on its execution of computer program instructions comprising a computer program stored in a computer-readable medium in or accessible to the processing element 1208.

The network node 1200 is arranged to operate in a cellular communication network. In particular, by the processing element 1208 being arranged to perform the embodiments demonstrated with reference to FIGS. 1 to 11, the network node 1200 when being a UE or Cluster Head is capable of D2D communication as demonstrated above. The network node 1200 may also be a controlling node of the cellular network, e.g. an eNodeB or a Cluster Head, and be arranged to perform the therewith associated tasks as demonstrated above. The processing element 1208 can also fulfill a multitude of tasks, ranging from signal processing to enable reception and transmission since it is connected to the receiver 1204 and transmitter 1206, executing applications, controlling the interfaces 1210, 1212, etc.

Figure 13:
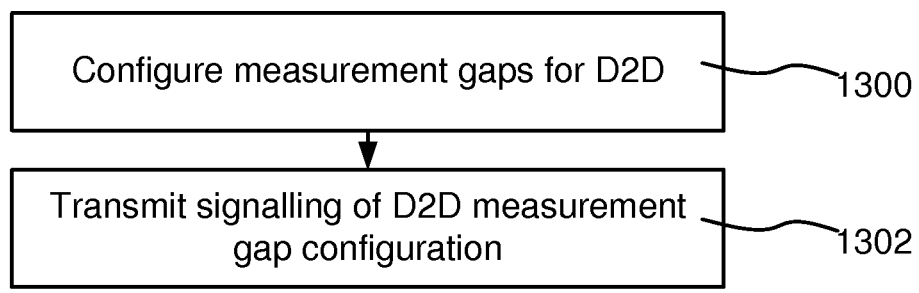
FIG. 13 is a flow chart illustrating a method according to embodiments, which is performed in a controlling node of the network.

FIG. 13 is a flow chart illustrating a method according to embodiments, which is performed in a controlling node of the NW, e.g. an eNodeB or Cluster Head. D2D measurement gaps are configured 1300. The configuration of measurement gaps are then transmitted 1302 to UEs as signaling of a set of measurement gaps for D2D operation. Such measurement gaps may be limited to UL and/or DL resources, only. The term measurement gap means that the UEs are not expected to transmit and/or receive any cellular signal on the serving cell during the measurement gap, as demonstrated above. Possibly, the signaling may indicate to the UE which carrier should be preferably monitored during the D2D measurement gaps. The D2D measurement gaps may overlap with the D2D subframes as defined above. In this case, explicit signaling of the position of the D2D measurement gaps may be avoided, because the UE is able to deduce the timing of the D2D measurement gaps from the timing of the D2D subframes.

Figure 14:
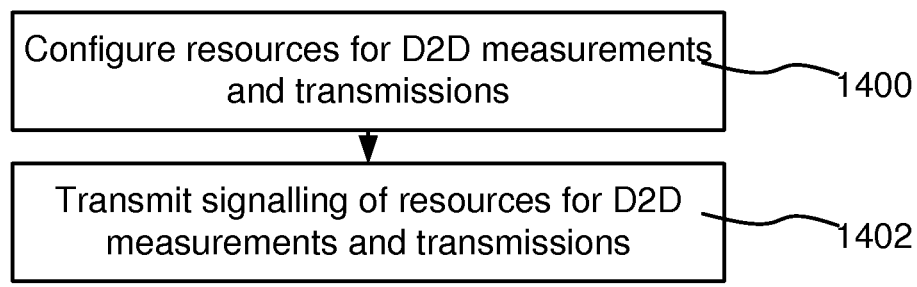
FIG. 14 is a flow chart illustrating a method according to embodiments, which is performed in a controlling node of the network.

FIG. 14 is a flow chart illustrating a method according to embodiments, which is performed in a controlling node of the NW, e.g. an eNodeB or Cluster Head. The D2D measurement is configured 1400 for a given UE on at least a subset of the resources assigned to D2D transmissions on the own cell and/or on other cells. Such other cells may operate on the same or on other carriers as the NW node configuring the D2D measurement gaps. The NW node may acquire information regarding the D2D resources used by devices in proximity in various ways, including signaling over backhaul, signaling by UEs and over the air measurements. The NW may even configure the D2D measurement gaps in such a way that collision with resources potentially used by RRC_IDLE UEs in the cell is avoided. For example, the D2D measurement gaps may be arranged not to overlap with subframes used for paging, random access channel (RACH), synchronization signal (e.g. primary/secondary synchronization signals, PSS/SSS) transmission, broadcast control information, cellular measurement gaps, etc. The configuration of resources are then transmitted 1402 to UEs as signaling of a set of resources for D2D operation.

Figure 15:
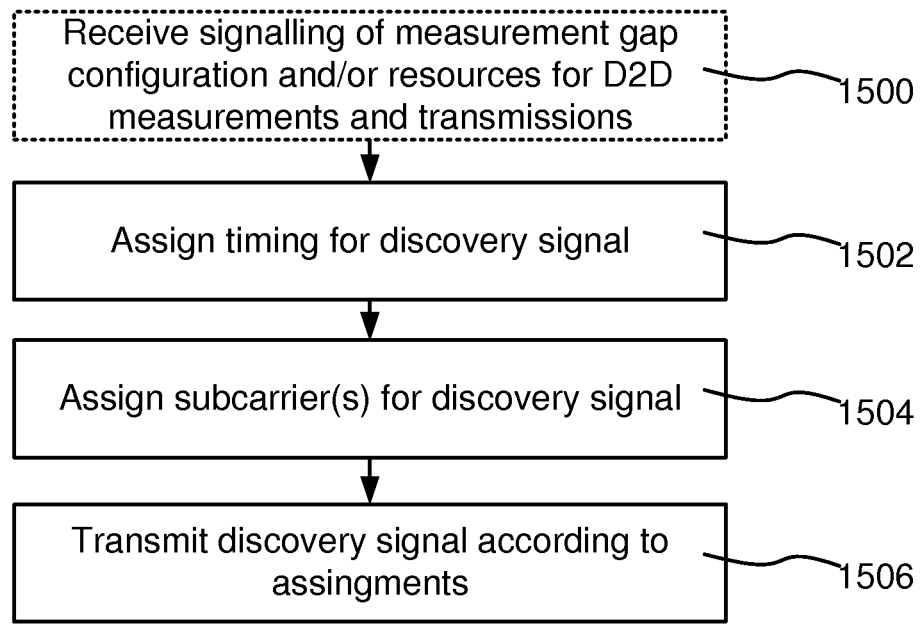
FIG. 15 is a flow chart illustrating a method according to embodiments, which is performed in a UE.

FIG. 15 is a flow chart illustrating a method according to embodiments, which is performed in a UE. Optionally, if such configurations are provided by the NW, as demonstrated with reference to FIGS. 13 and/or 14 above, the UE receives 1500 signaling of measurement gap configuration and/or resources for D2D measurements and transmissions, and adapts accordingly. Additionally or alternatively, the UE may adapt according to function of one or more identifiers provided by the communication system, as also demonstrated above. These adaptations have impact on assignment 1502 of timing for a discovery signal and/or assignment 1504 of subcarrier or subcarriers for the discovery signal, which are performed 1502, 1504 accordingly. The discovery signal is then sent 1506 according to the assignments.

Some aspects of the assignment of D2D resources according to a dynamic rule are summarized below with reference to FIGS. 16-18.

Figure 16:
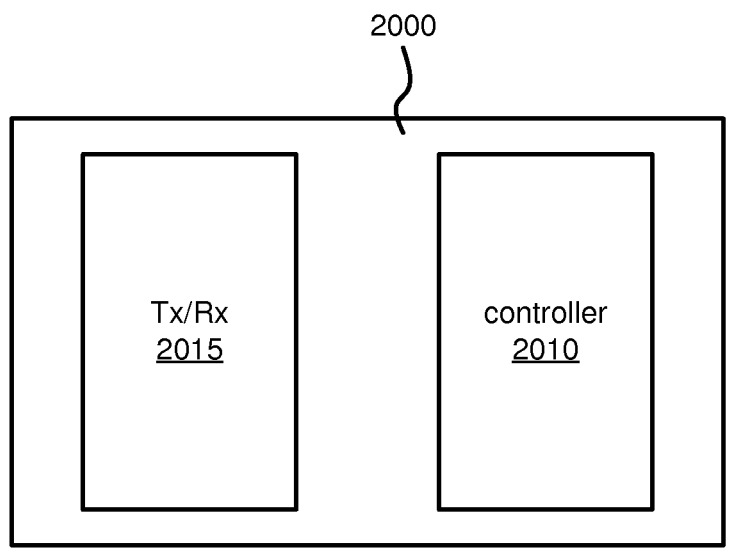
FIG. 16 is a simplified block diagram of a D2D-enabled device.

FIG. 16 is a simplified block diagram of a D2D-enabled device 2000 for operating in a cellular communication system. The device 2000 is arranged to transmit discovery signals for enabling D2D communication establishment in the cellular communication system. The device 2000 comprises a controller 2010 and a transceiver 2015. With reference to FIG. 12, the controller 2010 may e.g. comprise the processing element 1208. Furthermore, also with reference to FIG. 12, the transceiver 2015 may e.g. comprise the receiver 1204 and the transmitter 1206. According to some embodiments, the controller 2010 is arranged to assign a time in a periodic time schedule and at least a subcarrier among a plurality of subcarriers assigned for D2D communication based on a dynamic rule for spreading timing and/or subcarrier selection for the discovery signal, e.g. in accordance with what has been described above. Furthermore, in these embodiments, the transceiver 2015 is arranged to transmit the discovery signal according to the time and subcarrier assignment provided by the controller 2010.

Figure 17:
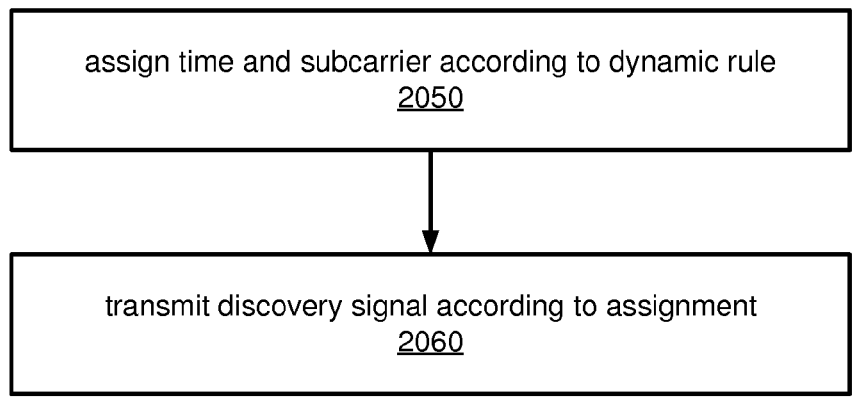
FIGS. 17-18 are flowcharts for methods according to embodiments.

FIG. 17 is a simplified flowchart of a method performed in the D2D enabled device 2000 (FIG. 16), for transmitting discovery signals for enabling D2D communication establishment in a cellular communication system. The method comprises step 2050 of assigning, by the controller 2010 of the device 2000, a time in a periodic time schedule and at least a subcarrier among a plurality of subcarriers assigned for D2D communication based on a dynamic rule for spreading timing and/or subcarrier selection for the discovery signal. Furthermore, the method comprises step 2010 of transmitting, by the transceiver 2015 of the device 2000, the discovery signal according to the time and subcarrier assignment provided by the controller.

Figure 18:
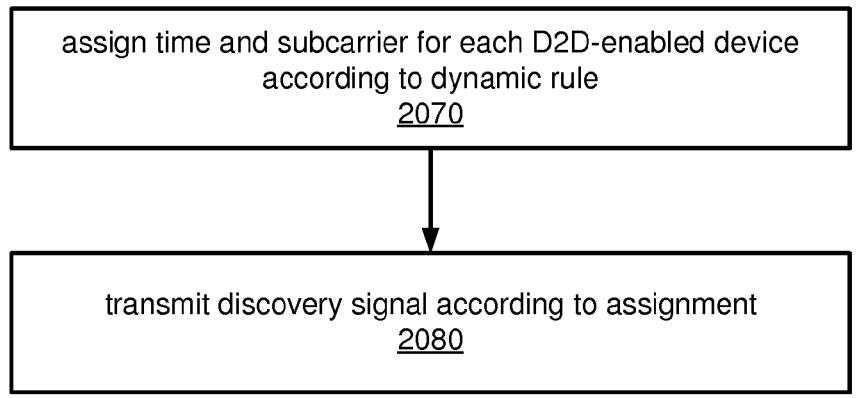

FIG. 18 is a flowchart of a method for transmitting discovery signals for enabling D2D communication establishment in a cellular communication system. The method comprises the step 2070 of assigning, for each D2D enabled device, a time in a periodic time schedule and at least a subcarrier among a plurality of subcarriers assigned for D2D communication of the communication system based on a dynamic rule for spreading timing and/or subcarrier selection for the discovery signal. Furthermore, the method comprises the step 2080 of transmitting the discovery signal by each of the respective D2D enabled devices according to the time and subcarrier assignment.

In accordance with what has been described above, the assignment of time referred to in the description of FIGS. 16-18 may comprise one of a plurality of timing offset steps, e.g. within a physical resource block defined by the communication system. For example, the assignment may comprise jittering the time around the respective timing offset step.

Furthermore, also in accordance with what has been described above, the dynamic rule referred to in the description of FIGS. 16-18 may comprise a function of one or more identifiers provided by the communication system such that timing assignment for respective D2D enabled device is determined by the function. For example, the identifiers provided by the communication system on which the function determines timing may comprise at least one of carrier frequency, network identity, and cell identity.

Moreover, also in accordance with what has been described above, the dynamic rule referred to in the description of FIGS. 16-18 may comprise a stochastic randomization function.

In accordance with what has been described above, the assignment of subcarrier or subcarriers referred to in the description of FIGS. 16-18 may comprise one of a plurality of subcarrier sets within a physical resource block defined by the communication system.

Also in accordance with what has been described above, the dynamic rule referred to in the description of FIGS. 16-18 may comprise a function of one or more identifiers provided by the communication system such that subcarrier assignment for respective D2D enabled device is determined by the function. For example, the identifiers provided by the communication system on which the function determines subcarrier assignment may comprise at least one of carrier frequency, network identity, and cell identity.

The dynamic rule mentioned above in the description of FIGS. 16-18 may be coordinated from a controlling node of the communication system. Accordingly, the transceiver 2015 (FIG. 16) may be adapted to receive the dynamic rule from said controlling node of the communication system.

Figure 19:
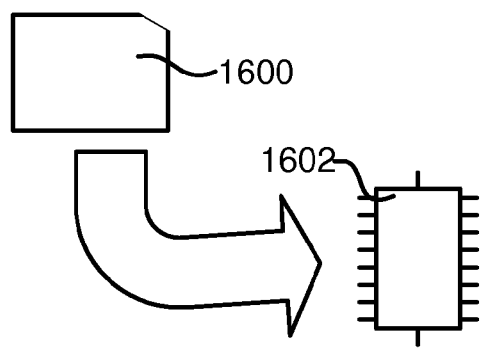
FIG. 19 schematically illustrates a computer-readable medium and a processing device.

The methods according to the present invention is suitable for implementation with aid of processing means, such as computers and/or processors, especially for the case where the processing element 1208 demonstrated above comprises a processor handling resource assignment. Therefore, there is provided computer programs, comprising instructions arranged to cause the processing means, processor, or computer to perform the steps of any of the methods according to any of the embodiments described with reference to FIGS. 1 to 11, 13 to 15, and 17-18. The computer programs preferably comprises program code which is stored on a computer readable medium 1600, as illustrated in FIG. 19, which can be loaded and executed by a processing means, processor, or computer 1602 to cause it to perform the methods, respectively, according to embodiments of the present invention, preferably as any of the embodiments described with reference to FIGS. 1 to 11, 13 to 15, and 17-18. The computer 1602 and computer program product 1600 can be arranged to execute the program code sequentially where actions of the any of the methods are performed stepwise. The processing means, processor, or computer 1602 is preferably what normally is referred to as an embedded system. Thus, the depicted computer readable medium 1600 and computer 1602 in FIG. 19 should be construed to be for illustrative purposes only to provide understanding of the principle, and not to be construed as any direct illustration of the elements.

The invention claimed is:

1. A method, performed in a device-to-device (D2D)-enabled device, for transmitting discovery signals for enabling device-to-device (D2D) communication establishment in a cellular communication system, the method comprising:
   assigning, by a controller of the device, a time in a periodic time schedule and at least a subcarrier among a plurality of subcarriers assigned for D2D communication based on a dynamic rule for spreading at least timing selection for the discovery signal transmission, wherein the dynamic rule comprises a function of one or more identifiers provided by the communication system and wherein timing assignment for the D2D enabled device is determined by the function, and wherein the identifiers provided by the communication system and based on which the function determines timing comprise at least one of carrier frequency, network identity, and cell identity; and
   transmitting, by a transceiver of the device, the discovery signal according to the time and subcarrier assignment provided by the controller.

2. The method of claim 1, wherein the assignment of time comprises one of a plurality of timing offset steps defined by the communication system.

3. The method of claim 2, wherein the assignment comprises jittering the time around the respective timing offset step.

4. The method of claim 1, wherein the dynamic rule comprises a stochastic randomization function.

5. The method of claim 1, wherein the assignment of subcarrier or subcarriers comprises one of a plurality of subcarrier sets within a physical resource block defined by the communication system.

6. The method of claim 1, wherein the dynamic rule is further for spreading of subcarrier selection for the discovery signal transmission and wherein the dynamic rule comprises a function of one or more identifiers provided by the communication system such that subcarrier assignment for respective D2D-enabled device is determined by the function.

7. The method of claim 6, wherein the identifiers provided by the communication system on which the function determines subcarrier assignment comprise at least one of:
   carrier frequency;
   network identity; and
   cell identity.

8. The method of claim 1, comprising:
   receiving, by the transceiver, the dynamic rule from a controlling node of the communication system, which controlling node is arranged to coordinate the dynamic rule.

9. A method for transmitting discovery signals for enabling device-to-device (D2D) communication establishment in a cellular communication system, the method comprising:
   assigning, for each D2D-enabled device, a time in a periodic time schedule and at least a subcarrier among a plurality of subcarriers for D2D communication based on a dynamic rule for spreading at least timing selection for the discovery signal transmission, wherein the dynamic rule comprises a function of one or more identifiers provided by the communication system and wherein timing assignment for each D2D enabled device is determined by the function, and wherein the identifiers provided by the communication system and based on which the function determines timing comprise at least one of carrier frequency, network identity, and cell identity; and transmitting the discovery signal by the respective D2D-enabled device according to the time and subcarrier assignment.

10. The method of claim 9, wherein the assignment of time comprises one of a plurality of timing offset steps defined by the communication system.

11. The method of claim 10, wherein the assignment comprises jittering the time around the respective timing offset step.

12. The method of claim 9, wherein the dynamic rule comprises a stochastic randomization function.

13. The method of claim 9, wherein the assignment of subcarrier or subcarriers comprises one of a plurality of subcarrier sets within a physical resource block defined by the communication system.

14. The method of claim 9, wherein the dynamic rule is further for spreading of subcarrier selection for the discovery signal transmission and wherein the dynamic rule comprises a function of one or more identifiers provided by the communication system such that subcarrier assignment for respective D2D-enabled device is determined by the function.

15. The method of claim 14, wherein the identifiers provided by the communication system on which the function determines subcarrier assignment comprise at least one of:
 carrier frequency;
 network identity; and
 cell identity.

16. The method of claim 9, wherein the dynamic rule is coordinated from a controlling node of the communication system.

17. A device-to-device (D2D)-enabled device, for operating in a cellular communication system, arranged to transmit discovery signals for enabling D2D communication establishment in the cellular communication system, the D2D-enabled device comprising:
 a processing circuit; and
 a transceiver;
 wherein the processing circuit is arranged to assign a time in a periodic time schedule and at least a subcarrier among a plurality of subcarriers assigned for D2D communication based on a dynamic rule for spreading at least timing selection for the discovery signal transmission, wherein the dynamic rule comprises a function of one or more identifiers provided by the communication system and wherein timing assignment for the D2D enabled device is determined by the function, and wherein the identifiers provided by the communication system and based on which the function determines timing comprise at least one of carrier frequency, network identity, and cell identity; and
 the transceiver is arranged to transmit the discovery signal according to the time and subcarrier assignment provided by the processing circuit.

18. The device of claim 17, wherein the assignment of time comprises one of a plurality of timing offset steps defined by the communication system.

19. The device of claim 18, wherein the assignment comprises jittering the time around the respective timing offset step.

20. The device of claim 17, wherein the dynamic rule comprises a stochastic randomization function.

21. The device of claim 17, wherein the assignment of subcarrier or subcarriers comprises one of a plurality of subcarrier sets within a physical resource block defined by the communication system.

22. The device of claim 17, wherein the dynamic rule is further for spreading of subcarrier selection for the discovery signal transmission and wherein the dynamic rule comprises a function of one or more identifiers provided by the communication system such that subcarrier assignment for respective D2D-enabled device is determined by the function.

23. The device of claim 22, wherein the identifiers provided by the communication system on which the function determines subcarrier assignment comprise at least one of:
 carrier frequency;
 network identity; and
 cell identity.

24. The device of claim 17, wherein the transceiver is arranged to receive the dynamic rule from a controlling node of the communication system, which controlling node is arranged to coordinate the dynamic rule.

25. A non-transitory computer-readable medium comprising, stored thereupon, computer program comprising instructions that, when executed on a processor of a device-to-device (D2D)-enabled device, cause the D2D-enabled device to:
 assign a time in a periodic time schedule and at least a subcarrier among a plurality of subcarriers assigned for D2D communication based on a dynamic rule for spreading at least timing selection for the discovery signal transmission, wherein the dynamic rule comprises a function of one or more identifiers provided by the communication system and wherein timing assignment for the D2D enabled device is determined by the function, and wherein the identifiers provided by the communication system and based on which the function determines timing comprise at least one of carrier frequency, network identity, and cell identity; and
 transmit a discovery signal according to the time and subcarrier assignment.

* * * * *